(12) United States Patent
Smith et al.

(10) Patent No.: US 8,290,144 B1
(45) Date of Patent: Oct. 16, 2012

(54) SYSTEM AND METHOD FOR COLLECTING POWER FROM A TELEPHONE LINE

(75) Inventors: Shane M. Smith, Paola, KS (US); Erik Geldbach, Olathe, KS (US); Kelsyn Donel Seven Rooks, Sr., Overland Park, KS (US); Mark Wilmoth, Gardner, KS (US); Myron Balthazor, Ottawa, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 929 days.

(21) Appl. No.: 12/057,223

(22) Filed: Mar. 27, 2008

(51) Int. Cl.
*H04M 1/00* (2006.01)
*H04M 9/00* (2006.01)

(52) U.S. Cl. ....................................................... 379/413

(58) Field of Classification Search ............. 379/428.04, 379/413; 455/412.1
See application file for complete search history.

(56) References Cited

U.S. PATENT DOCUMENTS

| | | | |
|---|---|---|---|
| 6,792,263 B1* | 9/2004 | Kite | 455/412.1 |
| 7,511,259 B2* | 3/2009 | Nyffenegger et al. | 250/227.11 |
| 2005/0152517 A1* | 7/2005 | Binder | 379/93.17 |

* cited by examiner

*Primary Examiner* — Alexander Jamal
(74) *Attorney, Agent, or Firm* — Swanson & Bratschun, L.L.C.

(57) ABSTRACT

A communications device including power collection unit and a communications unit. The power collection unit may be configured to collect a portion of power being delivered to the communications unit to enable communications. The power collection unit may be separable from the communications unit. The power collection unit may include a battery. Additionally, the power collection unit may include a light source, such as one or more LEDs, and be configured in a flashlight configuration.

20 Claims, 3 Drawing Sheets

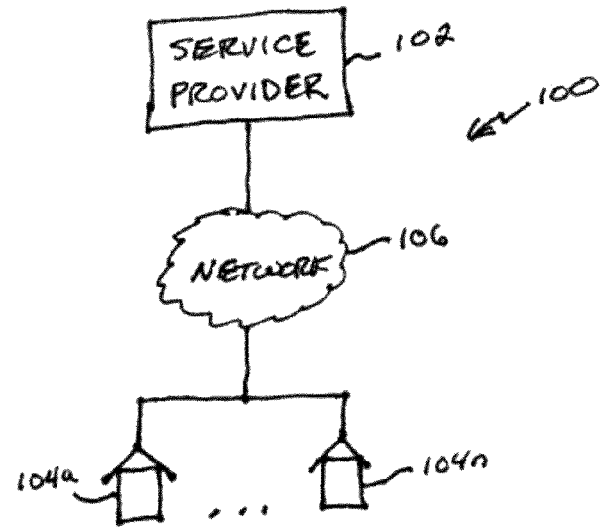
FIG. 1
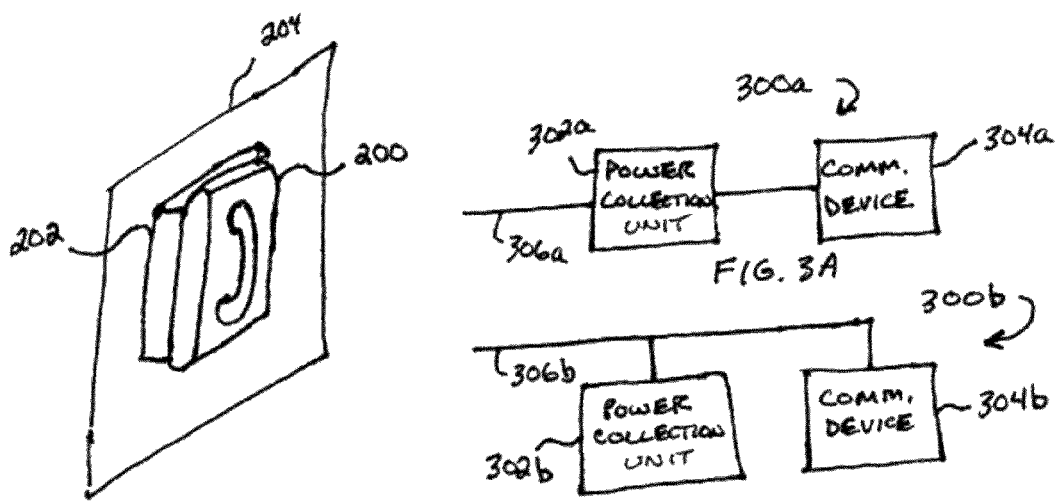
FIG. 2
FIG. 3A
FIG. 3B

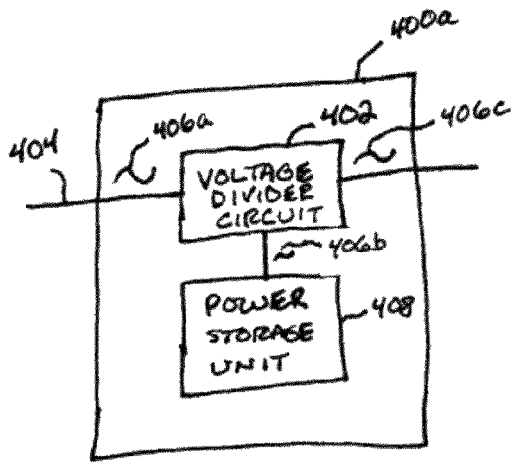
FIG. 4A
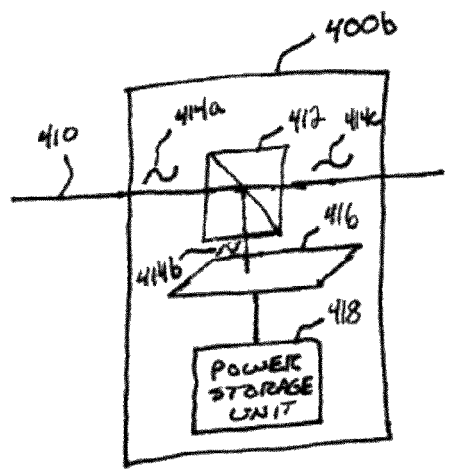
FIG. 4B
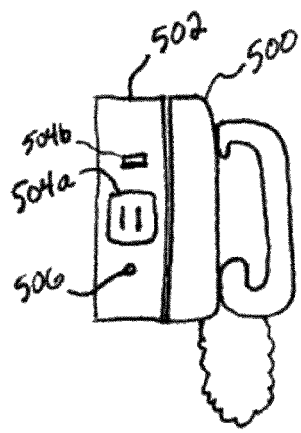
FIG. 5
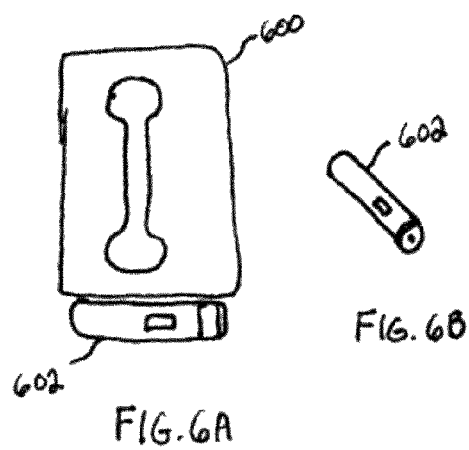
FIG. 6A
FIG. 6B

SYSTEM AND METHOD FOR COLLECTING POWER FROM A TELEPHONE LINE

BACKGROUND

The public switched telephone network (PSTN) provides power to telephones at residences via telephone lines. The power provided is relatively low, but provides enough power to maintain a telephone in a ready state while the telephone is on-hook. When a call is made to the telephone, the telephone rings, and when the telephone goes off-hook (i.e., user picks up or activates the handset), the telephone notifies a switch in the PSTN to activate the telephone line for a user to place a telephone call.

While the PSTN has traditionally been the primary source of telephone services in the past, more recent sources of communications has been fiber optics. Fiber optics provide optical communications to residences. The optical communications provide high bandwidth for both voice and data communications.

Each of the forms of communications, wired and optical, provide power to a residence. Much of this power is essentially unused or wasted as users allow their communications devices (e.g., telephone and computer) to remain idle a majority of the day and night. Service providers, however, have little choice but to supply power to the residences due to the nature of communications.

SUMMARY

To utilize unused power provided over telephone lines and fiber optic lines, the principles of the present invention provide for capturing or otherwise using a portion of the power being delivered by the telephone and fiber optic lines. In the case of capturing a portion of the power being delivered from the telephone lines, a certain percentage of the power may be used to charge a power collection unit that includes a power collection device, such as a rechargeable battery, or power a low power device, such as a light emitting diode. In the case of a power outage, the power collection unit may be utilized for powering a light, radio, or other device. In one embodiment, the power collection unit is adapted with an outlet and circuitry that may be used to drive either direct or alternating current devices. In the case of capturing power from a fiber optic line, a splitter may be used to divert a certain percentage of the optical power onto a photovoltaic cell to capture electrical power. Although the power being collected from either the PSTN or fiber optic is relatively low, over time, one or more batteries may be charged so as to be available during power outages.

One embodiment of a process for providing a power collection unit may include providing a power collection unit configured to simultaneously connect to a communications line and communications device. The power collection unit may simultaneously store a portion of power being delivered via the communications line. In simultaneously storing a portion of power being delivered via the communications line, the power collection unit may be configured in parallel or series with the communications device to divert a percentage of the power, such as ten percent. By storing a portion of the power, the communications device continues to receive enough power so as to be operable while the power is being stored by the power collection unit.

One embodiment of a communications device may include a power collection unit and a communications unit. The power collection unit may be configured to collect a portion of power being delivered to the communications unit to enable communications.

One embodiment of a process for collecting power may include collecting a portion of power being delivered from a communications system to a communications device. The communications device being operable while the portion of power is being collected. The power being collected may be from an optical signal. The power collected may be used to power a light source, such as an LED.

BRIEF DESCRIPTION OF THE DRAWINGS

Illustrative embodiments of the present invention are described in detail below with reference to the attached drawing figures, which are incorporated by reference herein and wherein:

FIG. 1 is an illustration of an exemplary communications network for providing telephone and/or data communications;

FIG. 2 is an illustration of an exemplary telephone and power collection unit;

FIGS. 3A and 3B are block diagrams of power collection units and communications devices in series and parallel configurations, respectively;

FIGS. 4A and 4B are illustrations of exemplary power collection units for use in electrical and optical communications systems, respectively;

FIG. 5 is an illustration of an exemplary telephone and power collection unit;

FIGS. 6A and 6B are illustrations of an exemplary telephone and power collection units.

DETAILED DESCRIPTION OF THE DRAWINGS

Figure 7:
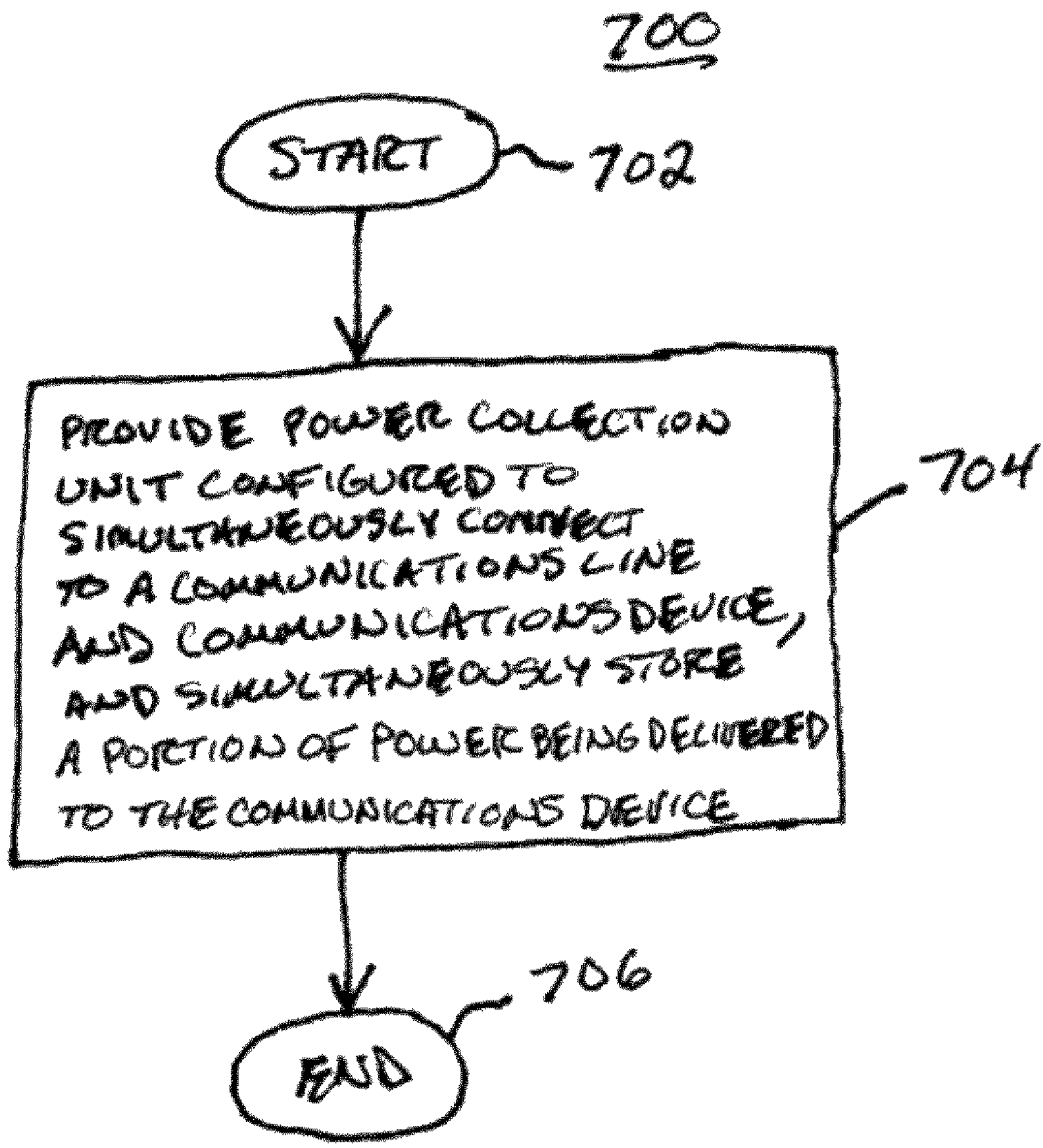
FIG. 7 is a flow diagram of an exemplary process for providing a power collection unit to a user.

FIG. 1 is an illustration of an exemplary communications network 100 for providing telephone and/or data communications. The communications network 100 includes a service provider 102 that provides communications services to customers 104a-104n (collectively 104) via a network 106. In one embodiment, the network is the PSTN. Alternatively, the network 106 may be a fiber optic network to providing voice and data communications. The customers may be residential or commercial. The service provider may be any service provider, including telephone, Internet, or otherwise.

FIG. 2 is an illustration of an exemplary telephone 200 and power collection unit 202. In this embodiment, the power collection unit 202 connects to a communications line, such as a telephone line, and the telephone 200. The power collection unit 202 may be configured to collect and store an electrical charge ("power") that is being provided to the telephone 200. In collecting the power, the power collection unit 202 may use a circuit, such as a voltage divider, to provide power to a power collection device (not shown), such as a battery or capacitor, in the power collection unit 202. In one embodiment, the battery includes one or more rechargeable batteries. The rechargeable batteries may be accessible from a housing of the power collection unit 202 and removable for use in an electronic device, such as a radio or flashlight. In one embodiment, the power collection unit 202 may include one or more lights, such as light emitting diodes (LEDs) that may be illuminated when power is being drawn to charge the power storage device. Multi-color LEDs may be used to show a first color (e.g., red) when the power storage device is being charged and a second color (e.g., green) when the power storage device is fully charged.

The power collection unit 202 is shown to be cordless in that no cords are utilized to connect the telephone 200 to the power collection unit 202 and no cords are utilized to connect the power collection unit 202 to a telephone jack (not shown), such as an RJ-11 telephone jack. In being cordless, the power collection unit 202 is configured with appropriate hardware to mount the power collection unit 202 to wall 204 or a wall mounted RJ-11 telephone jack and the telephone 200 to the power collection unit 202. It should be understood that alternative configurations of the power collection unit 202 may be provided that utilize cords for connecting to either or both of the telephone jack and telephone 200.

FIGS. 3A and 3B are block diagrams of configurations 300a and 300b with power collection units 302a and 302b and communications devices 304a and 304b in series and parallel, respectively. FIG. 3A shows power collection unit 302a in series with the communications device 304a. In the series configuration 300a, the power collection unit 302a draws power from a communication line 306a first and then the communication device 304a receives remaining power. FIG. 3B shows power collection unit 302b in parallel with the communications device 304b. In the parallel configuration 300b, the power collection unit 302b draws power from a communication line 306b at the same time as the communication device 304b. In both configurations 300a and 300b, enough power is provided to the communication devices 304a and 304b to enable the communications devices to operate normally. The communications devices 304a and 304b may be conventional telephones that draw power from the PSTN to operate. Alternatively, the communications devices 304a and 304b may be computing devices, televisions, or any other communications device in which signals in any form, electrical, optical, or otherwise, are provided on the communications lines 306a and 306b. The power collection units 302a and 302b may be configured to ensure that there is enough power or signal that is communicated to the communications devices 304a and 304b, respectively, to function normally. In functioning normally, the power and/or signals communicated to the communications devices 304a and 304b are to be compliant with standards for telecommunications, video communication, or any other power or signal usage, as understood in the art.

FIGS. 4A and 4B are illustrations of exemplary power collection units 400a and 400b for use in electrical and optical communications systems, respectively. As shown in FIG. 4A, the power collection unit 400a may include a voltage divider circuit 402 that in parallel or series diverts a percentage (e.g., 10 percent) of power being delivered to a communications device (not shown) via the communications line 404. As shown, a power signal 406a being communicated along the communications line 404 may power the voltage divider circuit 402, which is configured to divert a percentage of the power in a power signal 406b to power storage unit 408 and a remainder of the power signal 406a in power signal 406c to the communications device.

FIG. 4B illustrates an exemplary power collection unit 400b that uses one or more optical components to collect power from an optical communications line 410, such as a fiber optic line. As shown, the power collection unit 400b includes a splitter 412 to split off a percentage of a light signal 414a being passed through the optical communications line 410. In one embodiment, the splitter 412 may be configured to split ten percent or more or less than ten percent of the light from the light signal 414a to create a light signal 414b that may be illuminated onto a photovoltaic cell 416, which converts the light signal 414b into an electrical signal for storage in a power storage unit 418. Light signal 414c, which is the remaining percentage of the light signal 414a after the splitter 412, is communicated to a communication device (not shown). The power storage unit 418 may include a battery, capacitor, or any other electrical power storage element.

FIG. 5 is an illustration of an exemplary telephone 500 and power collection unit 502. As shown, the power collection unit 502 may include one or more outlets 504a and 504b (collectively 504) and illumination device 506, such as an LED. The LED may be utilized to notify a user when a power storage element is being charged and/or is fully charged. The outlets 504 may be standard outlets and enable one or more electrical devices, such as lights, radios, or otherwise, be powered. In one embodiment, the power collection unit 502 may include one or more electrical circuits configured to generate DC or AC current, as understood in the art.

FIGS. 6A and 6B are illustrations of an exemplary telephone 600 and power collection unit 602. The power collection unit 602 may be configured as a lighting device, such as a flashlight. As shown in FIG. 6B, the power collection unit 602 may be separable from the telephone 600 so as to provide a light source to a user in case of a power failure.

FIG. 7 is a flow diagram of an exemplary process 700 for providing a power collection unit to a user. The process 700 starts at step 702. At step 704, a power collection unit configured to simultaneously connect to a communications line and communications device may be provided. The power collection unit may simultaneously store a portion of power being delivered via the communications line. In simultaneously storing a portion of power being delivered via the communications line, the power collection unit may be configured in parallel or series with the communications device to divert a percentage of the power, such as ten percent. By storing a portion of the power, the communications device continues to receive enough power so as to be operable while the power is being stored by the power collection unit. The process ends at step 706. In one embodiment, the power collection may be integrated into the communications device. The communications device may be a telephone. The power collection unit may include one or more rechargeable batteries. Providing the power collection unit may include selling the power collection unit. The power collection unit may be cordless, whereby the power collection unit is configured to mount to hardware at a wall socket and provide support for a wall telephone, for example. The power collection unit may include an outlet. In one embodiment, the power collection unit may be configured with an illumination element, such as being configured as a flashlight. If the communications line is an optical line, such as a fiber optic cable, the power collection unit may include a splitter to split a portion of the light and a photovoltaic element to convert the portion of the light into electricity for storage of an electrical charge (i.e., power). In essence, the power being collected from the communications line is essentially free since it would otherwise be unused.

Although particular embodiments of the present invention have been explained in detail, it should be understood that various changes, substitutions, and alterations can be made to such embodiments without departing from the spirit and scope of the present invention as defined solely by the following claims.

What is claimed is:

1. A method for collecting power from a telephone line, said method comprising:

providing a power collection unit configured to be connected, at a single telephone line outlet, to a communications line simultaneously with a communications device adjacent to the power collection unit, the communications line being used to deliver power at the single telephone line outlet to the adjacent communications device;

diverting and storing, at the power collection unit, a portion of the power being delivered via the communications line at the single telephone line outlet, wherein the stored power at the power collection unit is not utilized to power the adjacent communications device; and providing, simultaneously, a remaining portion of the power being delivered via the communications line at the single telephone line outlet to the adjacent communications device connected to the power collection unit.

2. The method according to claim 1, wherein the power collection unit is external to the communication device.

3. The method according to claim 1, wherein providing a power collection unit includes providing a rechargeable battery.

4. The method according to claim 1, wherein providing a power collection unit includes selling a power collection unit adapted to connect to the communications line and communications device.

5. The method according to claim 1, wherein providing a power collection unit configured to be connected, at a single telephone line outlet, to a communications line simultaneously with a communications device adjacent to the power collection unit comprises providing a power collection unit where no cords are used to connect the power collection unit to the single telephone line outlet and providing a communications device where no cords are used to connect the communications device to the power collection unit.

6. The method according to claim 1, wherein providing a power collection unit includes providing a power collection unit with an outlet.

7. The method according to claim 1, wherein providing a power collection unit includes providing a power collection unit including a flashlight.

8. The method according to claim 1, wherein providing a power collection unit includes providing a power collection unit that includes an optical splitter to split a portion of a light signal used for communications in a fiber optic line used to provide communications for a communications device.

9. A communications device, comprising:

a power collection unit; and a communications unit adjacent to the power collection unit, said power collection unit configured to collect and store, at the power collection unit, a diverted portion of power being delivered through a communications line at a single telephone line outlet to said adjacent communications unit and simultaneously provide a remaining portion of the power being delivered through the communications line at the single telephone line outlet to the adjacent communications unit, wherein the stored power at the power collection unit is not utilized to power the adjacent communications device.

10. The communication device according to claim 9, wherein said power collection unit includes a battery.

11. The communication device according to claim 9, wherein said communications unit is a telephone.

12. The communication device according to claim 9, wherein said power collection unit includes a flashlight.

13. The communication device according to claim 9, wherein said power collection unit is separable from said communications unit.

14. The communication device according to claim 9, wherein said power collection unit includes an outlet configured to enable an electronic device to connect to receive power stored in said power collection unit.

15. The communication device according to claim 9, wherein said communications unit provides voice and data communications.

16. A method for collecting power, said method comprising:

collecting and storing, at a power collection unit, a diverted portion of power being delivered from a communications system through a single telephone line outlet to a communications device adjacent to the power collection unit; and providing a remaining portion of the power being delivered from the communications system through the single telephone line outlet to the adjacent communications device to power the adjacent communications device, wherein the adjacent communications device is operable while the diverted portion of power being delivered through the single telephone line outlet is being collected and stored at the power collection unit, and wherein the stored power at the power collection unit is not utilized to power the adjacent communications device.

17. The method according to claim 16, wherein collecting includes collecting the portion of power in parallel with power used to drive the communications device.

18. The method according to claim 16, further comprising enabling the collected power to be used to power an optical device.

19. The method according to claim 16, wherein collecting a portion of power includes splitting a light signal to generate electrical power from one portion of the separated light signal.

20. The method according to claim 16, further comprising generating a light source from the collected power indicative of the power being collected.

* * * * *